M. NICHOLS.
Baking Oven.

No. 200,625. Patented Feb. 26, 1878.

WITNESSES:
F. H. Gerecke.
S. R. Fecklin

INVENTOR:
Moses Nichols

UNITED STATES PATENT OFFICE.

MOSES NICHOLS, OF NEWBURG, NEW YORK.

IMPROVEMENT IN BAKING-OVENS.

Specification forming part of Letters Patent No. 200,625, dated February 26, 1878; application filed January 30, 1878.

*To all whom it may concern:*

Be it known that I, MOSES NICHOLS, of Newburg, in the county of Orange and State of New York, have invented a Baking-Oven, of which the following is a specification:

The nature of my invention consists in constructing a brick oven for baking bread, cake, crackers, pies, for roasting meat of any kind, and for all purposes for which an oven is used, which occupies very little space on the ground, but has three or more stories, shelves, or apartments, one above the other, so constructed that all are at the same time uniformly heated for that purpose.

These ovens can be made of different sizes, according to the work they have to do; therefore I will not specify any dimensions, but will remark that ovens built in this way, in which the baking-room was about two and one-half feet square, did a very large amount of baking as fast as a man can attend to it.

The walls may be hollow walls, with air-spaces between, or solid, built of brick. The flues are covered with cast-iron plates, as is each oven covered with similar plates; but these plates are covered in the baking-room floor with smooth tiles, as the bread is to lie on them, and in the flue-spaces with fire-clay, to protect the iron plates, and to prevent, in either case, the overheating of the ovens by the flash heat of the fire.

To describe this oven more plainly, I refer to the accompanying drawing, in which—

Figure 1:
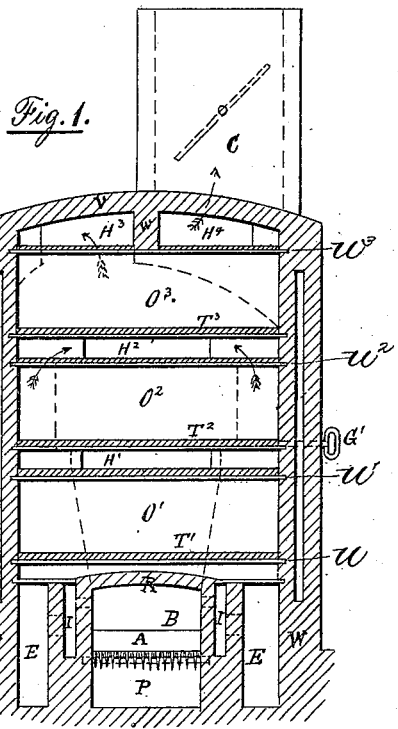
Figure 2:
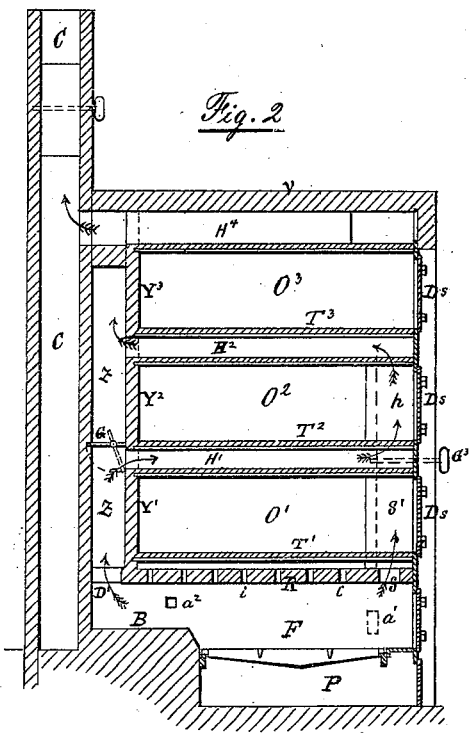
Figure 3:
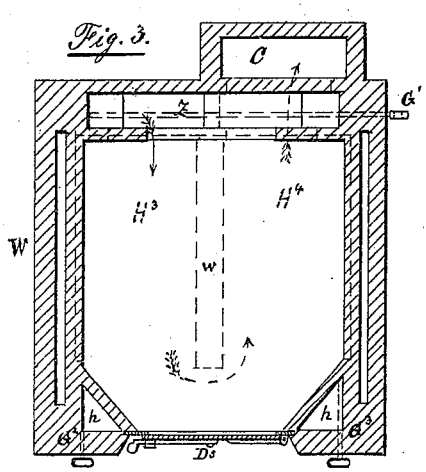
Figure 4:
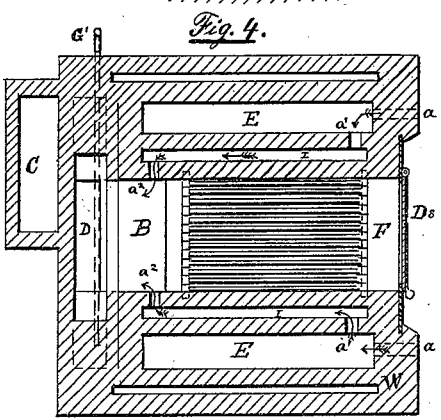

Figure 1 is a vertical transverse section. Fig. 2 is a vertical longitudinal section. Fig. 3 represents a horizontal section through one of the flues. Fig. 4 is a section through the fire-place.

F represents the fire-place, with the grate; P, the ash-pit below; B, the bridge-wall; D', the first flue-hole for the heat to ascend. The fire-space F is arched by a brick arch, R, in which are left a number of small holes, $i$ $i$, for the heat to reach the bottom plate U of the first oven $O^1$, directly above the fire. This plate U is covered by tiles T', to prevent the bottom of the oven from getting burning-hot.

The heat and flame passes through the hole D' in a space, Z, behind the ovens, and from there in the flue $H^1$, between the first oven, $O^1$, and the second one, $O^2$, as marked by arrows, going toward the front, and ascending at each front corner through the flues $h$ $h$ to the space $H^2$ between the second oven, $O^2$, and the third one, $O^3$, going toward the rear to the upper part of Z, returning toward the front on one side above the third oven, $O^3$, in flue $H^3$, turning at the front end, and going through flue $H^4$ to the chimney C. A damper or regulator, G, is situated in the space Z, to be worked from outside the wall W by handle $G^1$, or otherwise, to direct the heat to enter in the flue $H^1$, or to let a part or all of it go to the upper part of Z and enter flue $H^3$ direct. One flue-hole, S, is made in the front part of the arch R above the fire-space, to let heat pass through flues $S'$ $S'$, situated in the forward corners of oven $O^1$, similar to the flues $h$ $h$ above them, to the space $H^2$ between the upper ovens $O^2$ and $O^3$. This heat is regulated by two dampers, $G^3$, at the front of the furnace, and can be stopped off or admitted, as required. Another regulator of the draft is situated in the chimney C.

The iron plates $U^1$ $U^2$ $U^3$ form the top or ceilings of the ovens, but are covered on the sides toward the flues with fire-clay or other suitable material, so that the ovens cannot get overheated from above; and the bottoms of the ovens are laid with tiles $T^1$ $T^2$ $T^3$, on which to bake.

What I claim as my invention, and desire to secure by Letters Patent, is—

The baking-oven built of brick, iron plates, and tiles, consisting of three or more apartments, $O^1$ $O^2$ $O^3$, one above the other, with flues $H^1$ $H^2$ $H^3$ $H^4$ between and above them, flues S S, single fire-place F below, and damper-regulators $G^1$ $G^2$, arranged substantially as and for the purpose specified.

MOSES NICHOLS.

Witnesses:
   J. W. GERECKE,
   I. R. JECKLIN.